United States Patent
Renehan

[11] Patent Number: 5,644,213
[45] Date of Patent: Jul. 1, 1997

[54] ELECTRICAL GENERATING SYSTEM FOR A MOTOR VEHICLE

[75] Inventor: John Francis Renehan, South Lyon, Mich.

[73] Assignee: Ford Motor Company, Dearborn, Mich.

[21] Appl. No.: 639,138

[22] Filed: Apr. 26, 1996

[51] Int. Cl.$^6$ .................................................. H02P 9/00
[52] U.S. Cl. ................................................ 322/28; 322/25
[58] Field of Search ................................. 322/27, 28, 29

[56] References Cited

U.S. PATENT DOCUMENTS

| | | | |
|---|---|---|---|
| 3,942,097 | 3/1976 | Itoh et al. | 322/28 |
| 4,360,772 | 11/1982 | Voss | 322/28 |
| 4,379,990 | 4/1983 | Sievers et al. | 322/99 |
| 4,384,245 | 5/1983 | Metter | 322/28 |
| 4,386,310 | 5/1983 | Sivers | 322/28 |
| 4,470,003 | 9/1984 | Mitchell | 322/23 |
| 4,563,631 | 1/1986 | Mashino et al. | 322/33 |
| 4,659,977 | 4/1987 | Kissel et al. | 320/64 |
| 4,760,323 | 7/1988 | Naoi | 322/33 |
| 5,198,744 | 3/1993 | Kohl et al. | 322/33 |
| 5,210,480 | 5/1993 | Iwatani et al. | 322/28 |
| 5,376,876 | 12/1994 | Bauser et al. | 322/28 |
| 5,436,509 | 7/1995 | Migdal | 307/9.1 |

Primary Examiner—Steven L. Stephan
Assistant Examiner—Nicholas Ponomarenko
Attorney, Agent, or Firm—Mark S. Sparschu

[57] ABSTRACT

In one embodiment of the present invention, an electrical generation system for a motor vehicle provides voltage regulation in a normal mode to maintain a sensed battery voltage at a target value. Also, the system maintains effective fault mode voltage regulation at a target value in the event that the signal representing sensed battery voltage becomes corrupted. The system allows the normal mode target value and the fault mode target value to be chosen as closely together as desired. The system further allows, if desired, temporary voltage regulation at a higher voltage for higher-voltage electrical loads.

19 Claims, 2 Drawing Sheets

ELECTRICAL GENERATING SYSTEM FOR A MOTOR VEHICLE

BACKGROUND OF THE INVENTION

1. Field of the Invention

The present invention relates to electrical generating systems for motor vehicles.

2. Description of the Related Art

Some alternators for motor vehicles have two voltage regulation modes. In the first mode ("normal mode"), the alternator's voltage regulator is coupled to a voltage sensing point near the vehicle battery. The voltage regulator uses this connection as feedback in its effort to regulate the alternator output such that the battery voltage is maintained at a target value. The second mode, which can be referred to as "fault mode," is entered if the voltage sensing connection near the battery becomes corrupted, for example by the sense wire becoming open- or short-circuited. In fault mode, a loop-back connection within the alternator from the alternator's DC power output to the voltage regulator is used by the voltage regulator as a surrogate for the battery voltage feedback which has been lost.

However, there is a concern in such a system with a "normal mode" and a "fault mode." If the fault mode voltage target (as sensed at the sensing point near the battery) is set too close to the normal mode voltage target (as sensed at the alternator's DC power output), the voltage regulator of the alternator may "fight" between controlling to the normal mode voltage target and the fault mode voltage target. Typically, it is desirable to have the two targets within about one volt or less of one another, the typical voltage difference between the output of the alternator and the vehicle battery. However, with the two targets this close, the aforementioned fighting within the voltage regulator may occur. Thus, a system which can provide close voltage targets without the concern for fighting within the regulator can provide benefits over alternative systems.

The typical electrical system of a motor vehicle is designed to operate at a nominal voltage of about 12 volts DC. Accordingly, the typical electrical generating system in a motor vehicle generates electricity at a nominal voltage of about 12 volts DC. However, some specialized electrical loads may desire voltages above 12 volts for certain limited periods of time. An electrically-heated catalyst in a catalytic converter is one such load. Thus, an electrical generating system which can provide temporary excursions to a higher voltage can be advantageous.

In any motor vehicle electrical system, providing effective and reliable functionality in a system with minimal complexity is of foremost interest. Thus, an electrical generating system which can maintain the fault-mode performance described above, which can provide for temporary excursions if desired to a higher voltage output and which performs all of these functions with minimal complexity will prove beneficial.

SUMMARY OF THE INVENTION

The present invention provides a voltage regulator. The voltage regulator includes a first voltage divider having a first voltage divider input, a first voltage divider output and a first output/input voltage ratio. The voltage regulator further comprises a second voltage divider having a second voltage divider input, a second voltage divider output and a second output/input voltage ratio. Additionally, the voltage regulator has a first comparator for comparing a voltage at the first voltage divider output to a first predetermined voltage. Further, the voltage regulator includes a first transistor responsively coupled to the first comparator and coupled to an impedance to switchably insert the impedance into the second voltage divider.

The present invention also provides an alternator comprising a first voltage divider having a first voltage divider input and a first voltage divider output. The alternator further includes a second voltage divider having a second voltage divider input, a second voltage divider output and an output/input voltage ratio. In addition, the alternator has switching means responsively coupled to the first voltage divider output for switching a resistance into the second voltage divider to change the output/input voltage ratio.

In addition, the present invention provides a method for regulating voltage in a system including an alternator having a first voltage divider having a first voltage divider input and a first voltage divider output and a second voltage divider having a second voltage divider input, a second voltage divider output and an output/input voltage ratio, the first voltage divider input designed for coupling in a voltage sensing relationship to a vehicle battery and the second voltage divider input coupled within the alternator to a direct-current power output of the alternator. The method comprises sensing for whether the first voltage divider input is in the voltage sensing relationship with the vehicle battery. If the first voltage divider input is in the voltage sensing relationship, the method includes switching an impedance into the second voltage divider to change the output/input voltage ratio of the second voltage divider.

Electrical generating systems according to the present invention can provide many advantages. Such systems can provide a first nominal DC voltage output with temporary excursions to a higher voltage output. Further, such systems can maintain effective fault-mode performance. Also, systems according to the present invention can perform all of these functions in designs with minimal complexity.

BRIEF DESCRIPTION OF THE DRAWINGS

FIG. 2 is a more detailed electrical schematic showing in detail voltage regulator 26 of FIG. 1.

FIG. 3 is an electrical schematic showing an alternative design for a voltage regulator 26'.

DETAILED DESCRIPTION OF THE PREFERRED EMBODIMENTS

Figure 1:
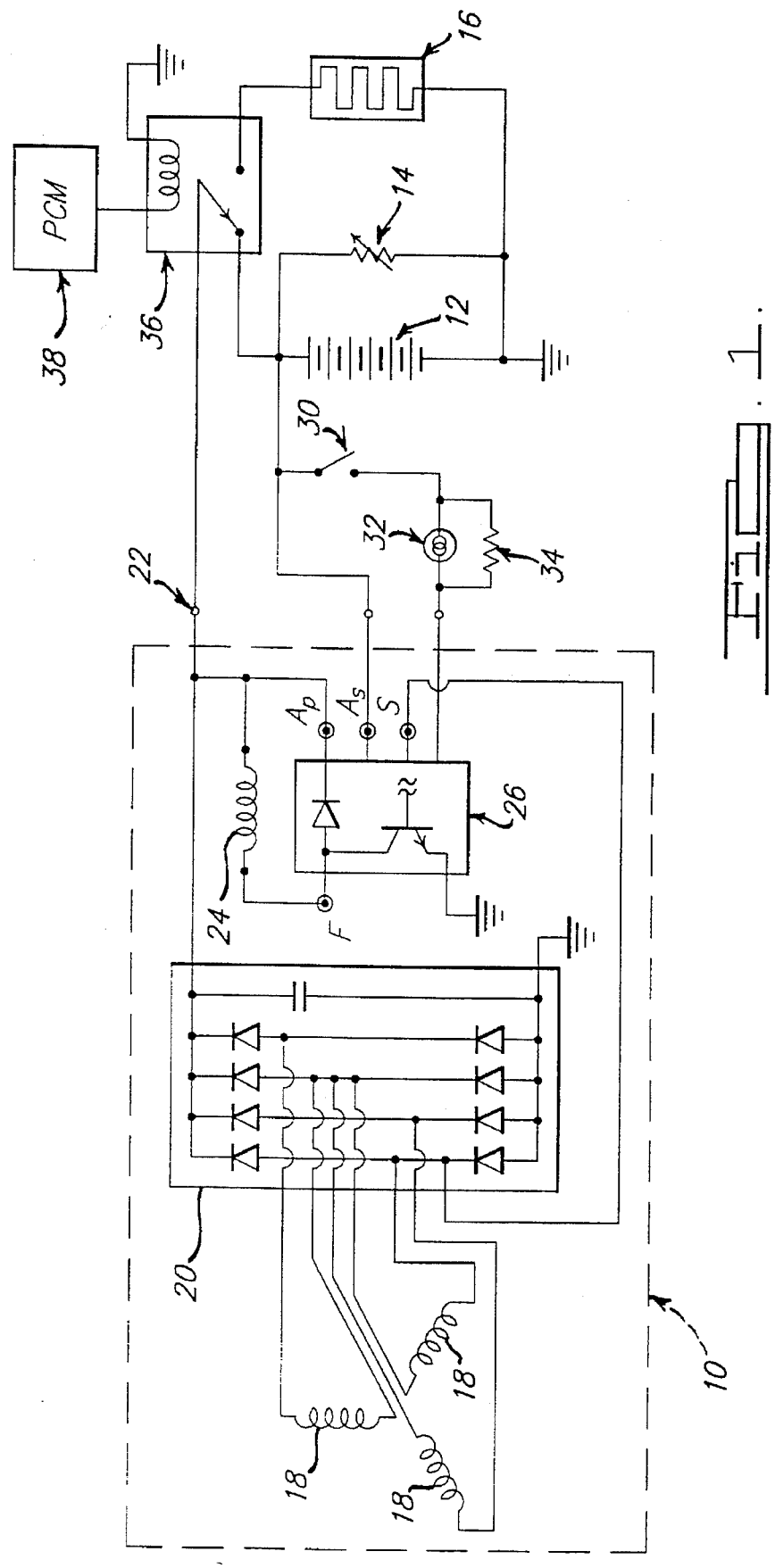
FIG. 1 is an electrical schematic of an electrical generation system according to one embodiment of the present invention.

1. Description of a System According to a First Embodiment

Figures 2, 3:
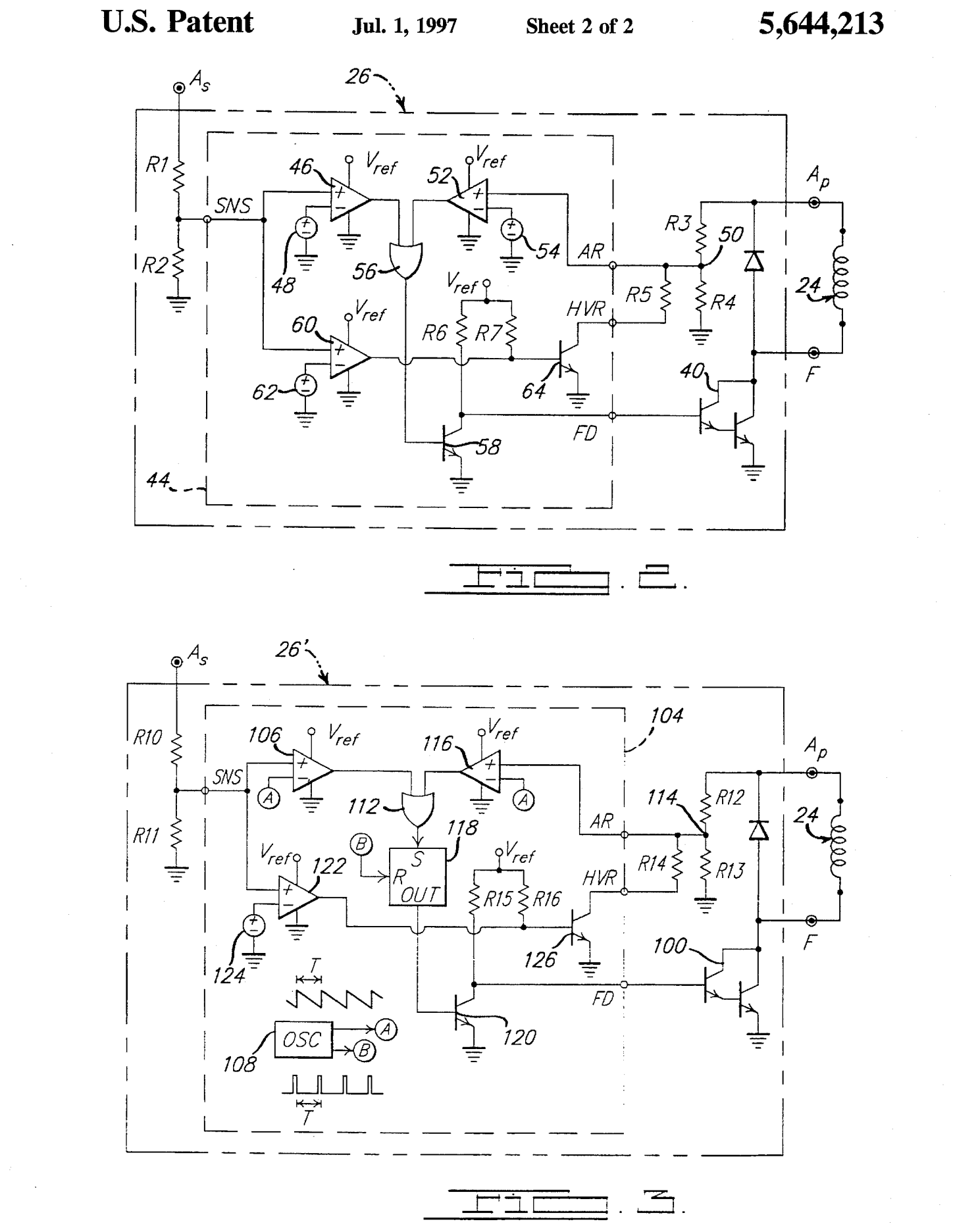

A first embodiment of the present invention is illustrated in FIGS. 1 and 2. Refer first to FIG. 1, where a vehicle electrical generating system is illustrated. The system includes an alternator 10, a battery 12 and a plurality of electrical loads 14. Electrical loads 14 are shown as a variable resistance in recognition that each of the various loads may be turned on or off at various times. In the preferred embodiment of the present invention, battery 12 and electrical loads 14 are devices designed to operate at a nominal voltage of 12 volts DC, although the present invention is not so limited.

The system of FIG. 1 also includes a higher-voltage electrical load 16. Higher-voltage electrical load 16 may be an electrically-heated catalyst for a catalytic converter. In the preferred embodiment of the present invention, higher-voltage electrical load 16 is designed to operate in the range of 30 to 40 volts DC.

Alternator 10 further includes three-phase stator coils 18. Also, alternator 10 comprises rectifier 20, which rectifies the three-phase output of stator coils 18 into direct-current power. The DC power output from rectifier 20 is provided via DC power output terminal 22. The DC output of rectifier 20 is also provided within alternator 10 to field coil 24, which provides electromagnetic flux for generation of power by stator coils 18.

Also included within alternator 10 is voltage regulator 26. Voltage regulator 26 includes an $A_p$ terminal, through which the DC output of rectifier 20 is provided to voltage regulator 26. Voltage regulator 26 also includes an $A_s$ terminal, through which the voltage of battery 12 is sensed via a battery voltage sense wire 28. Battery voltage sense wire 28 is dedicated to sensing the voltage of battery 12, so the voltage of battery 12 can be sensed with high accuracy. Because wire 28 is dedicated, I-R voltage drops in wire 28 from current drawn by other components do not degrade the voltage sensing ability of wire 28. Voltage regulator 26 also includes an F ("field") terminal, which voltage regulator 26 can pull down as necessary to control the current through field coil 24. It is through this control of current through field coil 24 that voltage regulator 26 regulates the voltage output of alternator 10. Voltage regulator 26 also includes an S ("stator") terminal, through which voltage regulator 26 senses the output voltage of one of stator coils 18. Voltage regulator 26 senses this voltage as a means of fault detection, as is known to those skilled in the art.

Also included in the system of FIG. 1 is an ignition switch 30 and a warning lamp 32. Via ignition switch 30 and lamp 32, voltage regulator 26 has a logic input to know when it should turn on. Also, voltage regulator 26 has the ability to turn warning lamp 32 on in the event voltage regulator 26 detects a fault in the charging system. Such capability to light a warning lamp is widely available in charging systems known to the art. A redundant resistor 34 assures that the logic signal from ignition switch 30 reaches voltage regulator 26 even in the event that warning lamp 32 burns out.

The system of FIG. 1 further includes a relay 36. Relay 36 alternatively connects power output terminal 22 of alternator 10 to battery 12 (and other 12-volt electrical loads 14) and to higher-voltage electrical load 16. In the event that higher-voltage electrical load 16 is an electrically-heated catalyst, relay 36 may be controlled by the powertrain control module 38 of the vehicle. Relay 36 is preferably an electromechanical relay, though other switching means such as a solid state relay could be used as well.

Voltage regulator 26 is illustrated in additional detail with additional reference to FIG. 2. Voltage regulator 26 includes an electrical driver 40 through which current through field coil 24 is controlled. Although electrical driver 40 is shown as a bipolar Darlington transistor, those skilled in the art will recognize that other devices, such as field effect transistors, can be substituted.

Coupled to the $A_s$ terminal of voltage regulator 26 is a voltage divider comprising resistors $R_1$ and $R_2$. One can say that the $A_s$ terminal is at the input to this voltage divider. The output 42 of this voltage divider is provided to the SNS pin of an integrated circuit 44 within voltage regulator 26. Within integrated circuit 44, this signal is provided to the non-inverting input of a comparator 46. The inverting input of comparator 46 is coupled to a pre-determined voltage 48, for example five volts DC. Resistors $R_1$ and $R_2$ and pre-determined voltage 48 are selected such that the non-inverting and inverting inputs of comparator 46 have equal voltages when battery 12 is at its predetermined target voltage. That is, when battery 12 is above its pre-determined target voltage as sensed by battery voltage sense wire 28, the output of comparator 46 is HIGH, and vice versa.

Coupled to the $A_p$ terminal of voltage regulator 26 is a second voltage divider comprising resistors $R_3$ and $R_4$. One can say that the $A_p$ terminal is at the input to this voltage divider. (Resistor $R_5$ can be switchably included in this voltage divider, as will be discussed later.) As the reader will recall, terminal $A_p$ is connected internally within alternator 10 to the output terminal 22 of alternator 10. Output 50 of the voltage divider is coupled to pin AR of integrated circuit 44, which is in turn coupled to the non-inverting input of a comparator 52. The inverting input of comparator 52 is coupled to a pre-determined voltage 54, for example five volts DC. Resistors $R_3$ and $R_4$ and predetermined voltage 54 are selected such that the non-inverting and inverting inputs of comparator 52 have equal voltages when output terminal 22 of alternator 10 is at its "fault-mode" voltage target. This "fault-mode" voltage target can be set equal to the normal mode voltage target (that sensed by battery voltage sense wire 28), or perhaps a small amount higher to account for output 22 of alternator 10 typically being a small amount higher in voltage than battery 12.

The outputs of comparators 46 and 52 are coupled as inputs to an OR gate 56. If either input of OR gate 56 is at a logic HIGH level, the output of OR gate turns transistor 58 ON. This in turn pulls down the base of electrical driver 40. This turns off current flow through field coil 24. Alternatively, if neither input of OR gate 56 is HIGH, transistor 58 remains OFF. Transistor 40 then gets base drive via resistor $R_6$ and goes into saturation. Field current is thus provided through field coil 24.

Integrated circuit 44 has a third comparator 60. The non-inverting input of comparator 60 is coupled to output 42 of the voltage divider comprising resistors $R_1$ and $R_2$. The inverting input of comparator 60 is coupled to a relatively small pre-determined voltage 62, for example two volts DC. The purpose of comparator 60 is to detect whether the signal from battery voltage sense wire 28 has become corrupted. Such corruption could occur, for example, if battery voltage sense wire 28 were to become open-circuited or were to become short-circuited to ground. In those events, the voltage at the non-inverting input to comparator 60 will fall below the voltage at the inverting input. The output of comparator 60 will then go LOW, turning off transistor 64. Resistor $R_5$ will then not be included in the voltage divider comprising resistors $R_3$ and $R_4$. If, on the other hand, the signal from battery voltage sense wire 28 is not corrupted, the voltage at the non-inverting input of comparator 60 will continuously be higher than the voltage at the inverting input. Transistor 64 will thus be ON, switching resistor $R_5$ essentially in parallel with resistor $R_4$. Resistor $R_7$ is selected to provide ample base drive so transistor 64 is driven deeply into saturation.

A reference voltage $V_{ref}$, preferably five volts, is provided to comparators 46, 52 and 60, to OR gate 56 and as a pull-up voltage for resistors $R_6$ and $R_7$.

2. Operation of the System of the First Embodiment a. Normal Mode Operation

Voltage regulator 26 operates as follows. Assume first that the signal from battery voltage sense wire 28 is not corrupted. When the system is in this state, we will refer to voltage regulator 26 as operating in "normal mode." With the signal from battery voltage sense wire 28 not corrupted, comparator 46 has the ability to sense the voltage at battery 12. Further, comparator 60 causes transistor 64 to turn ON, adding resistor $R_5$ to the voltage divider comprising resistors $R_3$ and $R_4$. The addition of resistor $R_5$ reduces the output/input voltage ratio of that voltage divider. That is, for a given input voltage, the output voltage of the voltage divider will be smaller due to the addition of resistor $R_5$.

If relay 36 connects output 22 of alternator 10 to battery 12 and other 12-volt electrical loads 14, voltage regulator 26 will control field coil 26 entirely based on the voltage sensed via comparator 46. This is because the voltage at the non-inverting input of comparator 52 will continually be below the voltage at the inverting input, due to the reduced ratio of the voltage divider comprising resistors $R_3$ and $R_4$. Comparator 52 will thus continually output a LOW signal to OR gate 56. Those familiar with Boolean logic recognize that with one input of an OR gate LOW, the output of the OR gate will assume the same state as the other input to the OR gate. Therefore, transistor 58, transistor 40 and the current through field coil 24 will be controlled to assure that the voltage sensed at battery 12 via battery voltage sense wire 28 will be at its target value (12 volts in this embodiment of the present invention).

Continue to assume that the signal from battery voltage sense wire 28 is not corrupted. That is, continue to assume that voltage regulator 26 is operating in "normal mode." If a higher-voltage supply to higher-voltage load 16 is desired, relay 36 is switched such that output 22 of alternator 10 is coupled to higher-voltage load 16. Now, the control of current through field coil 24 will not be based on the voltage sensed by battery voltage sense wire 28. This is because now, with battery 12 disconnected from output 22 of alternator 10, the voltage of battery 12 will dip somewhat. Therefore, comparator 46 will now output a LOW signal continuously. Thus, the state of the output of OR gate 56 will reflect the state of the output of comparator 52. Because of the reduced ratio of the voltage divider comprising resistors $R_3$ and $R_4$ (due to the inclusion of resistor $R_5$), the voltage at terminal $A_p$ can rise before the non-inverting input of comparator 52 reaches the voltage of the inverting input. This is the point at which comparator 52 will output a HIGH signal to OR gate 56 to turn off transistor 40 to prevent further rise in the output voltage at output terminal 22 of alternator 10. Of course, one can recognize that resistors $R_3$, $R_4$ and $R_5$ and predetermined voltage 54 should be selected such that the voltages at the noninverting and inverting inputs of comparator 52 are equal when the voltage at output terminal 22 reaches the higher voltage desired to drive higher voltage load 16.

b. "Fault Mode" Operation

Now, assume that the signal on battery voltage sense wire 28 has become corrupted. That is, voltage regulator 26 has now entered what we will call "fault mode." Two events will occur. One, comparator 60 will output a LOW signal, turning OFF transistor 64 and removing resistor $R_5$ from the voltage divider comprising resistors $R_3$ and $R_4$. Two, the noninverting input of comparator 46 will always be lower in voltage than the inverting input. Therefore, the state of transistor 58, the state of transistor 40 and the ON/OFF state of current flow through field coil 24 will be determined solely by the state of comparator 52. As has been discussed, resistors $R_3$ and $R_4$ and predetermined voltage 54 are selected so that the inputs of comparator 52 are equal in voltage when output of 22 alternator 10 is at its "fault mode" target value (12 volts or perhaps a bit higher in this example).

Regardless of the state of relay 36, the output 22 of alternator 10 when voltage regulator 26 is in "fault mode" will be held at the "fault mode" target value. Thus, if relay 36 is switched such that output 22 is coupled to battery 12 and other 12-volt electrical loads 14, fully functional voltage regulation occurs with output 22 controlled to the "fault mode" target value. This is a very good result from a failure mode analysis standpoint because it is expected that the system of this embodiment of the present invention will operate the overwhelming majority of the time with output 22 connected to the 12-volt loads. On the other hand, if relay 36 is switched such that output 22 is coupled to higher-voltage load 16, the voltage provided to higher-voltage load 16 will be well below the voltage at which higher-voltage load 16 is designed to operate. This is, however, a reasonable failure mode from the standpoint that no components of the vehicle will be damaged if this failure mode exists.

The control performed by voltage regulator 26 can be referred to as "bi-state" control. As long as the relevant sensed voltage (whether at terminal $A_s$ or $A_p$) is below its target value, electrical driver 100 is ON. When the relevant sensed voltage is above its target value, electrical driver 100 is OFF.

A very distinct advantage of the present system should be pointed out here. The fault mode voltage target for regulator 26 can be selected to be as close to the normal mode voltage target as desired, even equal to the normal voltage target, without concern about fighting within regulator 26. This is because with voltage sense wire 28 not corrupted, resistor $R_5$ is switched into the voltage divider comprising resistors $R_3$ and $R_4$. This reduces the output/input voltage ratio of the voltage divider, assuring that comparator 52 never has a HIGH output. That is, the $A_p$ input to voltage regulator 26 does not compete with the $A_s$ input, regardless how close the normal mode and fault mode voltage targets are. This advantage accrues whenever output 22 of alternator 10 is coupled to battery 12 and other 12-volt loads 14, regardless of whether this coupling is switchable due to the provision of higher-voltage load 16 or whether output 22 is permanently coupled to the 12-volt loads with no higher-voltage load 16 present.

3. Description of a System According to a Second Embodiment

A system according to a second embodiment of the present invention is illustrated with reference to FIGS. 1 and 3. FIG. 1, the system-level schematic of the system, has been previously described. That description will not be repeated here.

Refer now to FIG. 3. FIG. 3 includes a voltage regulator 26' and field coil 24. Voltage regulator 26' includes an $A_p$ terminal, through which the DC output of rectifier 20 (FIG. 1) is provided to voltage regulator 26'. Voltage regulator 26' also includes an $A_s$ terminal, through which the voltage of battery 12 (FIG. 1) is sensed via battery voltage sense wire 28. Voltage regulator 26' also includes an F ("field") terminal, which voltage regulator 26' can pull down as necessary to control the current through field coil 24.

Voltage regulator 26' includes an electrical driver 100 through which current through field coil 24 is controlled. Although electrical driver 100 is shown as a bipolar Darlington transistor, other devices, such as field-effect transistors, can be substituted.

Coupled to the $A_s$ terminal of voltage regulator 26' is a voltage divider comprising resistors $R_{10}$ and $R_{11}$. The output 102 of this voltage divider is provided to the SNS pin of an integrated circuit 104 within voltage regulator 26'. Within integrated circuit 104, this signal is provided to the non-inverting input of a comparator 106. The inverting input of comparator 106 is coupled to output "A" of an oscillator 108. The signal at output "A" is a sawtooth waveform with a period T preferably about 10 milliseconds. The output of comparator 106 is provided as an input to OR gate 112.

Resistors $R_{10}$ and $R_{11}$ and the amplitude and DC offset of the sawtooth waveform are preferably selected such that with the voltage of battery 12 (FIG. 1) at its target value, the voltage at output 102 and the voltage of the sawtooth waveform are equal when the sawtooth waveform is near the middle of its period T. The greater the voltage of battery 12, the greater the portion of period T that the voltage at the non-inverting input of comparator 106 is greater than the voltage at the inverting input. Conversely, the lower the voltage of battery 12, the lower the portion of period T that the voltage at the non-inverting input of comparator 106 is greater than the voltage at the inverting input. In fact, if the voltage of battery 12 sags enough, the non-inverting input will not be greater than the inverting input for any portion of period T.

Coupled to the $A_p$ terminal of voltage regulator 26' is a second voltage divider comprising resistors $R_{12}$ and $R_{13}$. Output 114 of the voltage divider is coupled to pin AR of integrated circuit 104, which is in turn coupled to the non-inverting input of a comparator 116. The inverting input of comparator 116 is coupled to output "A" of oscillator 108, the output which provides the aforementioned sawtooth waveform. The output of comparator 116 is coupled as an input to OR gate 112.

Resistors $R_{12}$ and $R_{13}$ and the amplitude and DC offset of the sawtooth waveform preferably selected such that with the voltage at output terminal 22 of alternator 10 (FIG. 1) at its "fault mode" target value, the voltage at output 114 and the voltage of the sawtooth waveform are equal when the sawtooth waveform is near the middle of its period T. The greater the voltage at output terminal 22, the greater the portion of period T that the voltage at the non-inverting input of comparator 116 is greater than the voltage at the inverting input. Conversely, the lower the voltage at output terminal 22, the lower the portion of period T that the voltage at the non-inverting input of comparator 116 is greater than the voltage at the inverting input.

The output of OR gate 112 is coupled to the "S" input of RS flip-flop 118. The "R" input of RS flip-flop 118 is coupled to output "B" of oscillator 108. Output "B" provides a train of narrow pulses having the same period T as the sawtooth waveform at output "A" of oscillator 108. The output of RS flip-flop 118 is coupled to the base of a transistor 120. Thus, when the output of RS flip-flop 118 is LOW, transistor 120 is OFF. In that event, electrical driver 100 is provided base current via resistor $R_{15}$. Electrical driver 100 is thus turned ON. Conversely, when the output of RS flip-flop 118 is HIGH, transistor 120 is ON, pulling down the base of electrical driver 100. Electrical driver 100 is thus OFF.

Output 102 of the voltage divider comprising resistors $R_{10}$ and $R_{11}$ is also coupled to the noninverting input of a comparator 122. The inverting input of comparator 122 is coupled to a small predetermined voltage 124. Predetermined voltage 124 is selected such that if the signal on battery voltage sense wire 28 (FIG. 1) becomes corrupted, such as by an open circuit or by a short circuit to ground, predetermined voltage 124 will be greater than the voltage at the noninverting input of comparator 122. The output of comparator 122 is coupled to the base of a transistor 126. The collector of transistor 126 is coupled to a resistor $R_{14}$, such that when transistor 126 is ON, resistor $R_{14}$ is effectively added into the voltage divider comprising resistors $R_{12}$ and $R_{13}$.

4. Operation of the System of the Second Embodiment a. Normal Mode Operation

Voltage regulator 26' operates as follows. Assume first that the signal from voltage sense wire 28 (FIG. 1) is not corrupted. Therefore, the system is in what we have called "normal mode." With the signal from voltage sense wire 28 not corrupted, comparator 106 has the ability to sense the voltage at battery 12 (FIG. 1). Also, comparator 122 causes transistor 126 to turn ON, adding resistor $R_{14}$ into the voltage divider comprising resistors $R_{12}$ and $R_{13}$. The output/input voltage ratio of the voltage divider is reduced due to this addition of resistor $R_{14}$.

For whatever portion of period T that the voltage at output 102 of the voltage divider comprising resistors $R_{10}$ and $R_{11}$ is less than the voltage of the sawtooth waveform at the inverting input of comparator 106, the output of comparator 106 will be LOW. Once the voltage of the sawtooth waveform has dropped sufficiently, the output of comparator 106 will go HIGH. The lower the voltage at output 102, the longer that output 106 takes to go HIGH.

Assume that relay 36 (FIG. 1) connects output 22 of alternator 10 to battery 12 and other 12-volt electrical loads 14. Alternatively, assume that no relay 36 and higher-voltage electrical load 16 are provided and that output 22 of alternator 10 is simply coupled permanently to battery 12 and other 12-volt electrical loads 14. In either event, the reduced output/input voltage ratio of the voltage divider comprising resistors $R_{12}$, $R_{13}$ and additionally $R_{14}$ will assure that the output 114 of the voltage divider now comprising resistors $R_{12}$, $R_{13}$ and $R_{14}$ will never be greater than the voltage of the sawtooth waveform at output A of oscillator 108. Thus, the output of comparator 116 will never be HIGH. Therefore, the output of OR gate 112 will be the same as the state of the output of comparator 106.

At the beginning of each period T, output "B" of oscillator 108 resets RS flip-flop 118 via input R. Thus, the output of RS flip-flop 118 goes LOW, turning OFF transistor 120. Electrical driver 100 is therefore ON, providing drive voltage to field coil 24. At whatever point during period T that the output of comparator 106 goes HIGH, the S input of RS flip-flop 118 also goes HIGH. This forces the output of RS flip-flop 118 HIGH, turning ON transistor 120. Thus, electrical driver 100 is OFF, cutting off drive voltage to field coil 24 until the beginning of the next period T. This sequence repeats itself for each succeeding period T. The result is a constant-frequency pulse-width-modulated (PWM) voltage signal being provided to field coil 24. The duty cycle of this signal (i.e., the fraction of the period T during which electrical driver 100 is ON) is inversely proportional to the voltage at output 102 of the voltage divider comprising resistors $R_{10}$ and $R_{11}$. The higher this voltage (that is, the higher the voltage of battery 12), the sooner during a period T that the output of comparator 106 goes HIGH and electrical driver 100 is turned OFF.

Assume now that relay 36 (FIG. 1) is switched such that output 22 of alternator 10 is connected to higher-voltage electrical load 16. The voltage of battery 12 will sag, such that the output of comparator 106 never goes HIGH. Thus, the state of the output of OR gate 112 reflects the state of the output of comparator 116. Because of the reduced output/ input voltage ratio of the voltage divider comprising resistors $R_{12}$ and $R_{13}$ due to the addition of resistor $R_{14}$, control of electrical driver 100 will be such that the voltage at terminal $A_p$ will be regulated at a higher voltage for higher-voltage electrical load 16.

The control performed by voltage regulator 26' can be called constant-frequency proportional error control. Voltage regulator 26' provides to electrical driver 100 a constant frequency signal whose deviation from a nominal duty cycle is proportional to the error between the sensed voltage (whether at terminal $A_s$ or $A_p$) and the desired target voltage.

b. "Fault Mode" Operation

Assume now that the signal from battery voltage sense wire 28 (FIG. 1) is corrupted. One result is that the output of comparator 122 is always LOW, removing resistor $R_{14}$ from the voltage divider comprising resistors $R_{12}$ and $R_{13}$. A second result is that the voltage at output 102 of the voltage divider comprising resistors $R_{10}$ and $R_{11}$ is greater than the voltage of the sawtooth waveform at the inverting input of comparator 106 for no portion of period T. Thus, the output of comparator 106 is always LOW, and the output of OR gate 112 therefore reflects the state of the output of comparator 116. Regardless of the state of relay 36 (FIG. 1), the voltage at output terminal 22 of alternator 10 will be regulated to the "fault mode" target value.

5. Summary

The system as described in this detailed description the system maintains reasonable fault-mode performance in the event that the battery voltage sensing function becomes corrupted. Further, the system allows voltage control of a vehicle electrical generating system at a first nominal DC voltage output with temporary excursions, if desired, to a higher voltage output. The system performs these functions in a configuration having minimal complexity.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A voltage regulator comprising:
   (a) a first voltage divider having a first voltage divider input, a first voltage divider output and a first output/input voltage ratio;
   (b) a second voltage divider having a second voltage divider input, a second voltage divider output and a second output/input voltage ratio;
   (c) a first comparator for comparing a voltage at said first voltage divider output to a first predetermined voltage; and
   (d) a first transistor responsively coupled to said first comparator and coupled to an impedance to switchably insert said impedance into said second voltage divider.

2. A voltage regulator as recited in claim 1, wherein with said impedance inserted into said second voltage divider, said second output/input voltage ratio is less than without said impedance inserted into said second voltage divider.

3. A voltage regulator as recited in claim 2, wherein with said impedance not inserted into said second voltage divider, said first output/input voltage ratio and said second output/input voltage ratio are equal.

4. A voltage regulator as recited in claim 1, further comprising:
   a second transistor;
   switching means controllably coupled to said first voltage divider output and to said second voltage divider output for switching said second transistor in response to a voltage at said first voltage divider output or a voltage at said second voltage divider output.

5. A voltage regulator as recited in claim 1, further comprising:
   a second transistor; and
   second switching means controllably coupled to said first voltage divider output and to said second voltage divider output for switching said second transistor in response to a voltage at said first voltage divider output under some conditions and in response to a voltage at said second voltage divider output under other conditions.

6. A method for regulating voltage in a system including an alternator having a first voltage divider having a first voltage divider input and a first voltage divider output and a second voltage divider having a second voltage divider input, a second voltage divider output and an output/input voltage ratio, said first voltage divider input designed for coupling in a voltage sensing relationship to a vehicle battery and said second voltage divider input coupled to a direct-current power output of said alternator, said method comprising:
   sensing whether said first voltage divider input is in said voltage sensing relationship with said vehicle battery; and
   if said first voltage divider input is in said voltage sensing relationship, switching an impedance into said second voltage divider to change said output/input voltage ratio.

7. A method as recited in claim 6, further comprising:
   if said first voltage divider input is decoupled from said voltage sensing relationship with said vehicle battery, switching said impedance out of said second voltage divider.

8. A method as recited in claim 6, wherein said system has an electrical ground, and wherein said method further comprises:
   if said first voltage divider input is short-circuited to said electrical ground, switching said impedance out of said second voltage divider.

9. An alternator comprising:
   a first voltage divider having a first voltage divider input and a first voltage divider output;
   a second voltage divider having a second voltage divider input, a second voltage divider output and an output/input voltage ratio; and
   switching means responsively coupled to said first voltage divider output for switching a resistance into said second voltage divider to change said output/input voltage ratio.

10. An alternator as recited in claim 9, wherein said output/input voltage ratio is reduced when said resistance is switched into said second voltage divider.

11. An alternator as recited in claim 10, further comprising:
    a direct-current power output, said direct-current power output coupled to said second voltage divider input.

12. An alternator as recited in claim 9, further comprising:
    a field coil adapted to provide electromagnetic flux for generation of electrical power by said alternator;

an electrical driver coupled to said field coil to switchably provide electrical current through said field coil; and second switching means controllably coupled to said first voltage divider output and to said second voltage divider output for switching said electrical driver in response to a voltage at said first voltage divider output under some conditions and in response to a voltage at said second voltage divider output under other conditions.

13. An alternator as recited in claim 12, further comprising:

a direct-current power output, said direct-current power output coupled to said second voltage divider input.

14. An alternator as recited in claim 13, wherein said output/input voltage ratio is reduced when said resistance is switched into said second voltage divider.

15. An alternator as recited in claim 9, further comprising;

a field coil adapted to provide electromagnetic flux for generation of electrical power by said alternator;

an electrical driver coupled to said field coil to switchably provide electrical current through said field coil; and switching means controllably coupled to said first voltage divider output and to said second voltage divider output for switching said electrical driver in response to a voltage at said first voltage divider output or a voltage at said second voltage divider output.

16. A vehicle electrical system comprising:

a battery; and an alternator as recited in claim 11;

wherein said first voltage divider input is electrically coupled in a voltage sensing relationship with said battery.

17. A vehicle electrical system as recited in claim 16, further comprising:

an electrical load;

third switching means adapted to alternatively couple said direct-current power output of said alternator to said battery and to said electrical load.

18. A vehicle electrical system comprising:

a battery; and an alternator as recited in claim 13;

wherein said first voltage divider input is electrically coupled in a voltage sensing relationship with said battery.

19. A vehicle electrical system as recited in claim 18, further comprising:

an electrical load;

third switching means adapted to alternatively couple said DC power output of said alternator to said battery and to said electrical load.

* * * * *